(No Model.)
W. VANDERMAN.
COMBINATION DIE STOCK AND REAMER.
No. 467,067.　　　　　　　　　Patented Jan. 12, 1892.
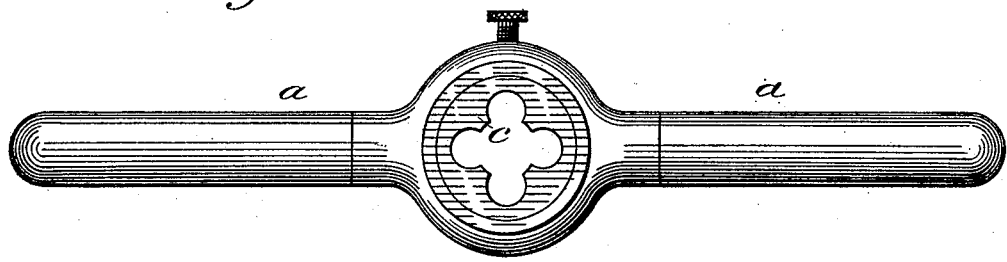
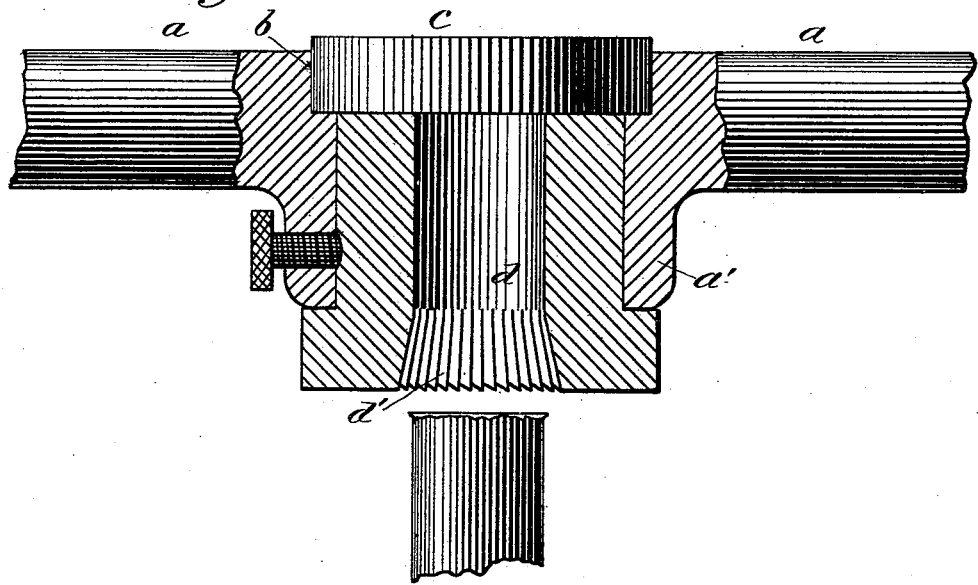
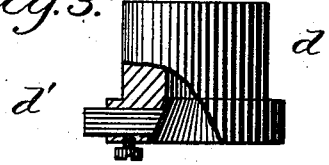
WITNESSES
INVENTOR.
William Vanderman
by Simonds & Burdett,
Attorneys.

UNITED STATES PATENT OFFICE.

WILLIAM VANDERMAN, OF WILLIMANTIC, CONNECTICUT.

COMBINATION DIE-STOCK AND REAMER.

SPECIFICATION forming part of Letters Patent No. 467,067, dated January 12, 1892.

Application filed May 12, 1891. Serial No. 392,527. (No model.)

*To all whom it may concern:*

Be it known that I, WILLIAM VANDERMAN, of Willimantic, in the county of Windham, State of Connecticut, have invented certain new and useful Improvements in Combination Die-Stocks and Reamers, of which the following is a full, clear, and exact description, whereby any one skilled in the art can make and use the same.

The object of my invention is to provide a device by means of which pipe or other articles that are cylindrical in outline may be properly prepared for having cut upon the end of the pipe a true thread—that is, one that is not uneven or crooked—and by its use to expedite particularly the cutting of a thread on pipe of any metal and in any branch of the trade in which pipes are used.

To this end my invention consists in the combination, with a die-stock, of a reamer and cleaner, and in details of the several parts making up the device as a whole, as more particularly hereinafter described, and pointed out in the claims.

Referring to the drawings, Figure 1 is a bottom view of a die-stock embodying my invention. Fig. 2 is a detail view in central section through the die-stock and a piece of pipe illustrating the manner of using my invention. Fig. 3 is a detail side view of the reamer and cleaner detached.

In fitting up a building or other locality with pipe of any kind for conducting fluids it is necessary to use thin lengths of pipe, and these thin lengths are usually connected by unions or terminate in caps or enter valves that are connected to them by means of interengaging threaded parts, so that it is necessary after having cut a given length of pipe to cut a thread on the end. In cutting a pipe by the ordinary means a burr or rough projection outward on the end of the pipe is necessarily formed, and this has to be removed before a proper thread can be cut. In wrought-iron pipe, particularly, there is apt to be a hard scale formed on the outside that it is desirable and customary to remove by filing, which is the common way of removing the burr also. This removal of the burr or of the scale by filing entails considerable work and expense, and my invention is particularly adapted and intended for accurately and completely removing this burr and in a measure centering the pipe, so that a thread may be properly cut on the end; and this centering and reaming device is embodied with the die-plate as a matter of convenience.

In the accompanying drawings, the letter *a* denotes a die-socket or die-plate of any convenient form having a die-socket *b*.

*c* denotes the die that is secured in the socket in the plate and held there in any convenient manner, as by means of clamp screws or pins. This die usually fits the socket, so that one side is flush with the face of the die-stock, but it is not essential. On one side of the die-stock a hub *a'* is formed of sufficient length to form a socket for a comparatively short tubular bushing and reamer *d*. This reamer is made of suitable size in exterior diameter to closely fit the socket in the hub, and may be secured there as by means of a clamp-screw located in a threaded socket in the hub and taking against the side of the bushing, or other convenient means may be used for holding the reamer in place. This reamer is tubular—that is, has a central opening of a size adapted to support the size of pipe that is to have a thread cut on it by the die—that is, the several dies and reamers are arranged in pairs, and a set of reamers having the suitable exterior diameter to fit within the reamer-socket, and of various sizes as to the opening or pipe socket, are intended to be used in carrying out my invention, although, of course, it is embodied when a single bushing and reamer is combined with the other parts, as described.

The outer end of the reamer is provided with a series of cutting-teeth *d'*, that may be integral with the body of the reamer or may be made separable therefrom and secured in place by any convenient means. The reamer-teeth are preferably made integral, and are formed on the sides of the inner wall of the reamer, that is made, preferably, somewhat flaring at the outer end. The advantage of this construction is that the roughness, scale, &c., are gradually removed by preliminary or roughing cut by the wider parts of the reamer, and then more closely trimmed to shape by the inner portion of the cutting-teeth. When the end of a pipe is trimmed by this device, the opening through the bushing or reamer may be made to conform quite closely to the outer surface of the pipe, so that a straight clear thread is cut upon the pipe. The result of this accurate cut of the pipe is that the couplings, unions, and other parts will all fit secure, true, and in line. The most important advantage, however, is in the saving in labor and time as compared with the old method of filing the pipe end and in the much greater durability of the dies that results from the removal of the scale on the exterior of the pipe that so quickly dulls and spoils the cutting-teeth on the die.

I claim as my invention—

1. In combination with the die-stock having a die-socket and reamer-socket, a removable reamer and bushing provided with reamer-teeth, all substantially as described.

2. As an improved article of manufacture, a tubular reamer shaped to fit a reamer-socket in a die-stock and having the flaring end provided with reamer-teeth, all substantially as described.

3. In combination with a die-stock having a die-socket and a reamer-socket, a removable die having cutting-teeth, a removable tubular reamer having cutting-teeth arranged about the inner wall, and the clamping means for holding the reamer in the reamer-socket, all substantially as described.

WILLIAM VANDERMAN.

Witnesess:
JAMES T. LYNCH,
PATRICK FITZPATRICK.